United States Patent
Kobilka et al.

(10) Patent No.: US 10,752,776 B2
(45) Date of Patent: Aug. 25, 2020

(54) CYCLIC BIO-RENEWABLE FLAME RETARDANTS

(71) Applicant: International Business Machines Corporation, Armonk, NY (US)

(72) Inventors: Brandon M. Kobilka, Tucson, AZ (US); Jacob T. Porter, Highland, NY (US); Jason T. Wertz, Pleasant Valley, NY (US); Joseph Kuczynski, North Port, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/135,131

(22) Filed: Sep. 19, 2018

(65) Prior Publication Data

US 2020/0087515 A1    Mar. 19, 2020

(51) Int. Cl.
| | |
|---|---|
| *C08L 87/00* | (2006.01) |
| *C08L 57/00* | (2006.01) |
| *C08K 5/5317* | (2006.01) |
| *C08K 5/5313* | (2006.01) |

(52) U.S. Cl.
CPC ............ *C08L 87/00* (2013.01); *C08K 5/5313* (2013.01); *C08K 5/5317* (2013.01); *C08L 57/00* (2013.01); *C08L 2201/02* (2013.01)

(58) Field of Classification Search
None
See application file for complete search history.

(56) References Cited

U.S. PATENT DOCUMENTS

| | | | |
|---|---|---|---|
| 4,302,595 | A | 11/1981 | Schoengen et al. |
| 9,822,208 | B1 | 11/2017 | Kobilka et al. |
| 2010/0314243 | A1 | 12/2010 | Frost et al. |
| 2017/0073501 | A1 | 3/2017 | Timberlake et al. |
| 2017/0226271 | A1 | 8/2017 | Makal et al. |

FOREIGN PATENT DOCUMENTS

| | | |
|---|---|---|
| CN | 105086449 A | 11/2015 |
| WO | 2012082725 A1 | 6/2012 |
| WO | 2017113956 A1 | 7/2017 |

OTHER PUBLICATIONS

Li, Ailei et al. Macromolecular Chemistry and Physics Year 2015; 216(4), 450-459.*

Settle et al., "Heterogeneous Diels-Alder catalysis for biomass-derived aromatic compounds," Green Chemistry, Aug. 2017, vol. 19, No. 15, pp. 3468-3492, The Royal Society of Chemistry. DOI: 10.1039/c7gc00992e.

SpecialChem, "Muconic Acid Market to Reach USD 86.54 Mn by 2020: TMR," SpecialChem, Industry News, Aug. 3, 2016, p. 1. https://polymer-additives.specialchem.com/news/industry-news/tmr-forsees-muconic-acid-market-to-expand-by-2020-000183145)

Miller et al., "Synthesis of Biobased Terephthalic Acid from Cycloaddition of Isoprene with Acrylic Acid," Supporting Information, ACS Sustainable Chemistry & Engineering, 2014, 2 (8), pp. S1-S8.

"Reactions from ACS Sus Chem Eng 2014—Synthesis of biobased Terephthalic Acid from Cycloaddition of Isoprene with Acrylic Acid," Sci Finder Results, printed Jan. 12, 2018, pp. 1-18.

"6-member diels-alder phosphinates," Sci Finder Results, printed Jan. 12, 2018, pp. 1-5.

"5-membered diels-alder phosphorous compounds," Sci Finder Results, printed Jan. 12, 2018, pp. 1-7.

Pacheco, J., "Materials and Methods for Investigating New Diels-Alder-Dehydration Routes to PTA," Chapter 2 of Thesis (Dissertation (Ph.D.)), New Catalysts for the Renewable Production of Monomers for Bioplastics, California Institute of Technology, 2015, pp. 21-39. https://thesis.library.caltech.edu/8866/19/JJ%20PACHECO%20PHD%20THESIS_MAY%202015_Chapter%202.pdf.

* cited by examiner

*Primary Examiner* — Ana Z Muresan
(74) *Attorney, Agent, or Firm* — Kelsey M. Skodje

(57) ABSTRACT

A bio-renewable flame-retardant compound is disclosed. The bio-renewable flame-retardant compound includes a cyclic structure formed in a reaction with a bio-renewable diene.

3 Claims, 8 Drawing Sheets

CYCLIC BIO-RENEWABLE FLAME RETARDANTS

BACKGROUND

The present disclosure relates to flame retardants and more specifically to bio-renewable Diels-Alder reaction-enabled flame retardants from renewable starting compounds.

Bio-based, renewable compounds are sustainable and can be used to replace petroleum-based raw materials in substances to synthesize bio-renewable substances. Polymers are often made from bio-renewable compounds for usage in plastics, artificial fibers, coatings, adhesives, and rubbers. Bio-renewable substances can be efficiently and inexpensively produced on an industrial scale through numerous strategies. Examples of these strategies can include fermentation technologies, membrane technologies, and genetic engineering. Muconic acid (2E, 4E-hexa-2,4-dienedioic acid) and furfural (furan-2-carbaldehyde), used to produce furans, are examples of bio-renewable compounds. Biological conversion of sugars and lignin-derived aromatic compounds are commonly used to produce muconic acid.

SUMMARY

Various embodiments are directed to a bio-renewable flame-retardant compound comprising a cyclic moiety formed in a Diels-Alder reaction involving a bio-renewable diene and a dienophile. The dienophile can contain a protective group selected from a group consisting of trialkylsilyl, benzyl, and a cyclic ether, and a phosphorus-based moiety. The cyclic moiety can be tricyclic or a six-membered ring. The compound can also include at least one phosphorus-based moiety that is able to bind to a polymer. The phosphorus-based moiety can include at least one functional group independently selected from a group consisting of alkyl groups, alkoxy groups, aryl groups, aryloxy groups, vinyl groups, allyl groups, and allyloxy groups. The bio-renewable diene can be selected from a group consisting of a muconic acid, a muconic acid derivative, a furan, and a furan derivative.

Additional embodiments are directed to a process of forming a bio-renewable flame retardant. The process can include the selection of a bio-renewable diene and a dienophile, and then reacting them and an optional phosphorus compound to form a cyclic flame-retardant compound through a Diels-Alder reaction. The compound can then be incorporated into a polymer. The bio-renewable diene can be selected from a group consisting of a muconic acid, a muconic acid derivative, a furan, and a furan derivative. The cyclic flame-retardant compound can include a phosphorus-based moiety having at least one non-reactive or reactive R functional group. The non-reactive R functional group can be selected from a group consisting of an alkyl group, an aryl group, and an aryloxy group. The reactive R functional group can be selected from a group consisting of an allyl group, a vinyl group, and an allyloxy group. Incorporating the cyclic flame-retardant compound into the polymer can include blending the polymer with the cyclic flame-retardant compound or polymerizing the flame-retardant compound.

Further embodiments are directed to an article of manufacture comprising a material containing a bio-renewable flame-retardant compound formed in a Diels-Alder reaction involving a bio-renewable diene. The bio-renewable diene can be selected from a group consisting of a muconic acid, a muconic acid derivative, a furan, and a furan derivative. The article of manufacture can comprise an electronic component, and the material can be a polymer formed by polymerizing the bio-renewable flame-retardant compound.

DETAILED DESCRIPTION

Figure 1:
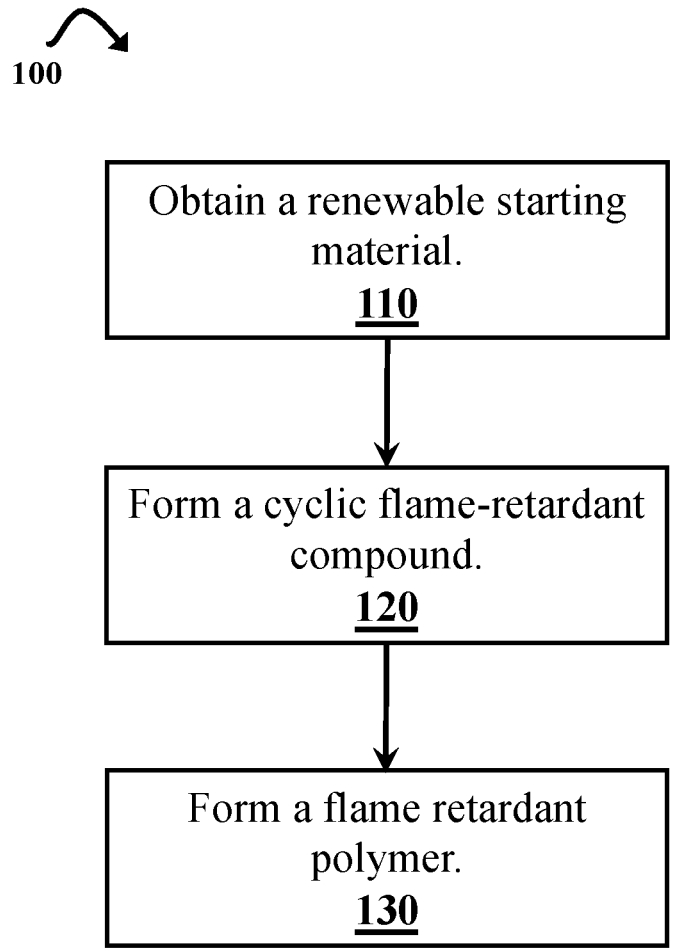
FIG. 1 is a flow diagram illustrating a process of forming a bio-renewable flame-retardant polymer, according to some embodiments of the present disclosure.

Renewable, sustainable, and bio-based compounds promote environmental sustainability, and are increasingly being used in the synthesis of substances that previously required petroleum-based raw materials. Many types of flame retardants are petroleum-based, but petroleum is a non-renewable natural resource that is increasing in cost. Eventually, the stores of oil within the planet will be depleted, yet the need for flame-retardant products will stay at an all-time high. In addition to a shrinking petroleum supply, environmental regulatory controls are becoming stricter to protect both the environment and non-renewable resources.

Sustainable materials are becoming more prevalent due to advances in biotechnology that have provided numerous strategies for efficiently and inexpensively producing bio-renewable compounds on an industrial scale. Examples of these strategies are found in fermentation technologies, membrane technologies, and genetic engineering. Biotechnological strategies can include plant-based and microorganism-based approaches. Plant-based approaches can involve obtaining a material directly from a plant, or growing plant tissues or cells that can produce bio-renewable compounds from various substrates using their own biosynthetic pathways. Microorganism-based approaches involve using native or genetically modified fungi, yeast, or bacteria to produce a desired compound from a structurally similar substrate.

Oftentimes, materials such as polymers are made flame-retardant by being combined with flame-retardant additives, which requires the polymers to undergo additional processing. The additional processing is costly and time consuming. Certain polymers, such as polyhexahydrotriazine polymers (PHT), are negatively affected by the additives. PHT polymers face compromised mechanical abilities when combined with flame-retardant additives. Additionally, when the materials combined with additives are disposed of (e.g., in a landfill) they can negatively impact the environment and the exposed organisms around them. Even with the potential environmental implications, flame-retardant materials are essential in a variety of industries such as construction and electronics. The market is only growing, as more of the flame-retardant materials are needed as the population increases. Most homes are created with materials that are resistant to a variety of destructive forces, and flame retardancy is a common example of these resistant properties. Many types of buildings, such as schools, require the use of flame-retardant materials to comply with regulations.

Sustainability of materials is an important consideration in the industrial world and markets. The environmental implications of petroleum-based materials are overwhelming, especially on the scale that the products made from them are used. Due to these implications, bio-renewable replacements for many of these materials have been slowly explored. Many materials (e.g., plastics and synthetic fibers) are now a mixture of bio-renewable and petroleum-based components, which can help reduce environmental impact. However, the composite materials often lose desirable material and reactive properties of both the bio-based and petroleum-based components. Bio-renewable content in polymers is an attractive quality in the market and becoming an essential quality, but with the drawbacks of petroleum-based compounds, it is clear that 100% bio-renewable materials are needed.

Muconic acid (2E,4E-hexa-2,4-dienedioic acid) is an example of a bio-renewable compound that can have applications as a starting material for various polymers and small molecules. It is a solid organic acid with a melting point of approximately 301° C. It is a naturally occurring (e.g., as a metabolite) medium-chain fatty acid, though it can also be derived from other naturally occurring biomolecules (e.g., sorbic acid). On an industrial scale, muconic acid is commonly obtained via biological conversion of sugar and lignin-derived aromatic compounds. For example, cultures or cocultures of microorganisms such as *Escherichia coli* (*E. coli*) and *Saccharomyces cerevisiae* (*S. cerevisiae*) can be used to derive muconic acid from biomolecules such as glucose, salicylic acid, and glycerol. Muconic acid can also be derived from adipic acid.

Furan is another example of a compound that can be obtained from bio-renewable sources and have applications as a component of various polymers and small molecules. A furan is a type of cyclic ether that can optionally be substituted. Herein, unless otherwise specified, "furan" refers to an unsubstituted furan. Furan can be produced on an industrial scale by decarbonylating furfural (furan-2-carbaldehyde), a common agricultural byproduct, over a noble metal catalyst. The most common noble metal catalyst used is palladium on charcoal.

According to the present disclosure, cyclic flame-retardant compounds derived from muconic acid and furan are formed and used to produce a variety of flame-retardant polymers. The cyclic bio-renewable flame-retardant compounds include small molecules, cross-linkers, monofunctional molecules, and monomers. These compounds can be added to polymers during blending, curing, foaming, extrusion, or other processing techniques in order to produce flame-retardant polymers. In some embodiments, the cyclic bio-renewable flame-retardant compounds are attached to or contained inside of microcapsules or nanocapsules, which can be added to a polymer. Further, the cyclic bio-renewable flame-retardant compounds can be polymerized to form flame-retardant polymers in some embodiments. The structure of a cyclic molecule is more rigid than that of a linear compound, and this rigidity gives polymers formed by the polymerization of cyclic compounds their strength. In some embodiments, bio-renewable flame-retardant compounds can be polymerized as homopolymers or in combination with at least one additional class of monomers to form flame-retardant co-polymers.

FIG. 1 is a flow diagram illustrating a process 100 of forming a flame-retardant polymer, according to some embodiments of the present disclosure. Process 100 includes obtaining a bio-renewable starting material. This is illustrated at step 110. The bio-renewable starting materials are muconic acid compounds (muconic acid and muconic acid derivatives) or furan compounds (furan and furan derivatives). Muconic acid and furan can be obtained from biomass feedstocks using any appropriate processes (e.g., conventional decomposition techniques). An example of a biomass source of muconic acid is lignocellulosic sugars, and biomass sources for furan can include hexose carbohydrates, pentose-containing materials, and cellulosic solids such as pine wood. Additional examples of bio-based sources from which muconic acid and furan can be obtained are discussed in greater detail above.

Figure 2:
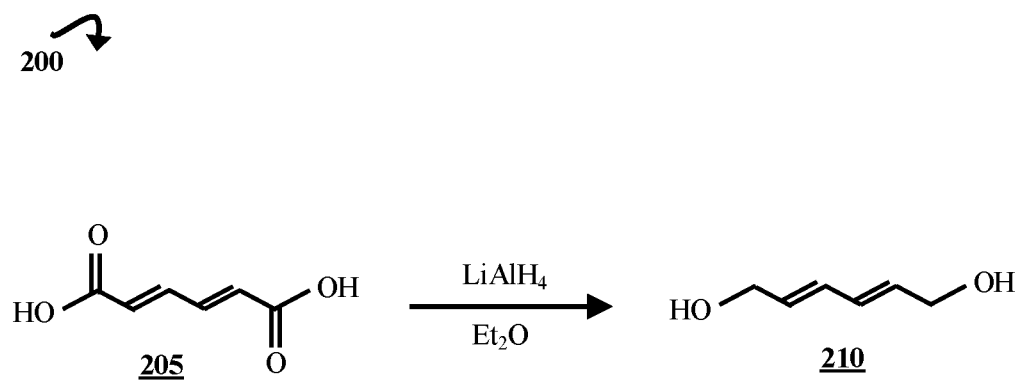
FIG. 2 is a chemical reaction diagram illustrating a process of forming a muconic acid derivative, according to some embodiments of the present disclosure.

It should be noted that there are three isomers of muconic acid, which differ in geometry around the double bonds. These isomers are trans,trans-muconic acid, cis,trans-muconic acid, and cis,cis-muconic acid. Herein, "muconic acid" refers to trans,trans-muconic acid unless otherwise specified. An example of trans,trans-muconic acid is illustrated in FIG. 2. However, cis,trans-muconic acid and/or cis,cis-muconic acid may be used as a starting material in some embodiments. These isomers are converted to trans,trans-muconic acid prior to further reactions to form the cyclic flame-retardant compounds. Isomerization of cis,cis- and cis,trans-muconic acid can be carried out in earlier steps or in situ using any conventional muconic acid isomerization processes. For example, a solution of cis,cis- or cis,trans-muconic acid can be exposed to ultraviolet light or combined with a molecular iodine catalyst, resulting in trans,trans-muconic acid.

Derivatives of muconic acid and furan are obtained through synthetic processes involving the isolated muconic acid and furan. Examples of muconic acid derivative syntheses are discussed in greater detail below. Examples of processes for forming substituted furan derivatives (e.g., 2,5-dimethylfuran, 2,5-diethylfuran, 2,5-furandicarboxylic methyl ester, 2,5-furandicarboxylic acid) are the Feist-Benary synthesis and the Paal-Knorr synthesis. In Feist-Benary, alpha-halogen ketones and beta-dicarbonyl compounds produce substituted furans. The Paal-Knorr synthesis involves an acid-catalyzed cyclization of substituted 1,4-dicarbonyl compounds to form the substituted furan.

Process 100 continues with forming a cyclic bio-renewable flame-retardant compound. This is illustrated at step 120. The formation includes a Diels-Alder reaction involving a bio-renewable diene (e.g., muconic acid, a muconic acid derivative, furan, or a substituted furan derivative) and an electrophilic alkene ("dienophile"). In some embodiments, the dienophile is a substituted alkene. Further, the dienophile can be cyclic or acyclic. Additional reactions are carried out after the Diels-Alder reaction in some embodiments. For example, phosphorus-based flame-retardant moieties or other substituents can be added to a cyclic compound resulting from the Diels-Alder reaction. In other embodiments, the flame-retardant compounds are complete after carrying out a Diels-Alder reaction. For example, a dienophile having phosphorus-based flame-retardant moieties can be included in the Diels-Alder reaction.

A phosphorus compound is involved in the synthesis of each of the cyclic flame-retardant compounds at step 120, either in the Diels-Alder reaction or a subsequent reaction. The phosphorus compounds provide phosphorus-based moieties that add flame-retardancy to the resulting cyclic biorenewable flame-retardant compounds. Each phosphorus compound includes at least one phosphorus-based moiety and at least one R functional group (R and/or R'). Phosphorus compounds that can be used include phosphoric acid derivatives, phosphonate derivatives, phosphine oxide derivatives, phosphoryl chloride, and phosphorus trichloride. The phosphorus compounds can be synthesized as needed through known synthetic methods or obtained from commercial sources.

The R functional groups are independently selected from reactive functional groups and non-reactive functional groups. Herein, "reactive" refers to the functional group's tendency to participate in reactions that include polymerization and binding to polymer chains. These reactions are discussed in greater detail below. Examples of reactive R groups have reactive moieties such as allyl, epoxy, amine, carboxylate, propylene carbonate, and hydroxyl. The reactive R groups can have other moieties as well, such as hydrocarbyl moieties with or without heteroatoms (e.g., nitrogen, oxygen, halogens, sulfur, etc.). Examples of hydrocarbyl groups include cyclic and/or acyclic aliphatic moieties optionally containing one or more double and/or triple bonds. The acyclic aliphatic groups can be branched or unbranched. Examples of hydrocarbyl groups include alkyl, alkenyl, alkynyl, cycloalkyl, cycloalkenyl, alkaryl, and aralkyl groups.

Non-reactive R functional groups are those that do not have reactive moieties for participating in the binding or polymerization reactions. However, depending on the structure of the non-reactive groups, they can contribute to the overall properties of the flame-retardant compounds, such as steric hindrance and polarity. Non-reactive R groups can be hydrocarbyl groups without heteroatoms, though they can include heteroatoms in some embodiments. Non-reactive hydrocarbyl groups that can be used include alkyl, alkenyl, alkynyl, cycloalkyl, cycloalkenyl, alkaryl, and aralkyl groups.

Process 100 continues with forming a flame-retardant polymer with the cyclic flame-retardant compound. This is illustrated at step 130. The cyclic flame-retardant polymer can be formed in different ways, depending upon the R functional groups on the cyclic flame-retardant compound. In some embodiments, the cyclic flame-retardant compound contains at least one reactive R functional group, which can allow the compound itself to be polymerized. Examples of reactive R groups are discussed in greater detail above. Examples of polymerization processes are in accordance with polymer chemistry platforms that can include polycarbonates, polymers obtained by radical polymerization, polyurethanes, polyesters, polyacrylates, epoxy resins, polyimides, polyureas, polyamides, poly(vinyl-esters), etc. Compounds with one reactive functional group can also be bound to polymer chains, and compounds with two or more reactive functional groups can act as cross-linkers in various polymers. In other embodiments, the cyclic flame-retardant compounds are small molecules containing only non-reactive functional groups. Examples of non-reactive R groups are discussed in greater detail above. These small molecules are blended with polymers in order to impart flame retardancy to the polymers.

Polymerization processes for the cyclic flame-retardant compounds are selected based on the identities of their reactive R groups. For example, when R is allyl, the cyclic flame-retardant compound can be reacted with a Ziegler-Natta catalyst (ZNC). The polymerization of 1-alkenes is catalyzed by ZNCs. Examples of ZNCs that can be used can include heterogeneous ZNCs based on titanium compounds and homogenous ZNCs based on complexes of titanium, zirconium, or hafnium. Heterogeneous and homogenous ZNCs can be used in combination with organoaluminium co-catalysts in some embodiments.

Further, when the reactive R group is an epoxy, the flame-retardant compound can be reacted with a base and a second monomer to form a heteropolymer. Examples of compounds that can be used as a second monomer include compounds with at least two hydroxyl groups or at least two amino groups (e.g., diols, polyols, diamines, polyamines, etc.). Cyclic flame-retardant compounds having epoxy R groups can also self-polymerize to form homopolymers under basic conditions.

Another example of a reactive R group that can be on the flame-retardant compounds is propylene carbonate. Propylene carbonate functional groups can optionally be formed by reacting the flame-retardant compounds having epoxy groups with carbon dioxide and lithium bromide. When the R group is propylene carbonate, the flame-retardant compound can be polymerized in a base-initiated ring-opening reaction. Examples of bases that can be used as initiators can include potassium hydroxide, sodium hydroxide, lithium hydroxide, 1,8-diazabicyclo [5.4.0] undec-7-ene (DBU), triazabicyclodecene (TBD), and alkoxide or acetate bases.

FIG. 2 is a chemical reaction diagram illustrating a process 200 of forming a muconic acid derivative, according to some embodiments of the present disclosure. In process 200, muconic acid 205 is reacted with lithium aluminum hydride ($LiAlH_4$) in a diethyl ether ($Et_2O$) solution. The carboxylic acid groups (—COOH) on muconic acid 205 are reduced by $LiAlH_4$, yielding a hexadiene diol derivative 210 of muconic acid 205. Under the appropriate reaction conditions, process 200 can use reducing agents other than $LiAlH_4$ (e.g., hydrogen ($H_2$) with a palladium-on-carbon (Pd/C) catalyst, sodium borohydride ($NaBH_4$) with an electrophile (e.g., iodine), carbon monoxide (CO), iron (II) compounds, etc.).

Figure 3A:
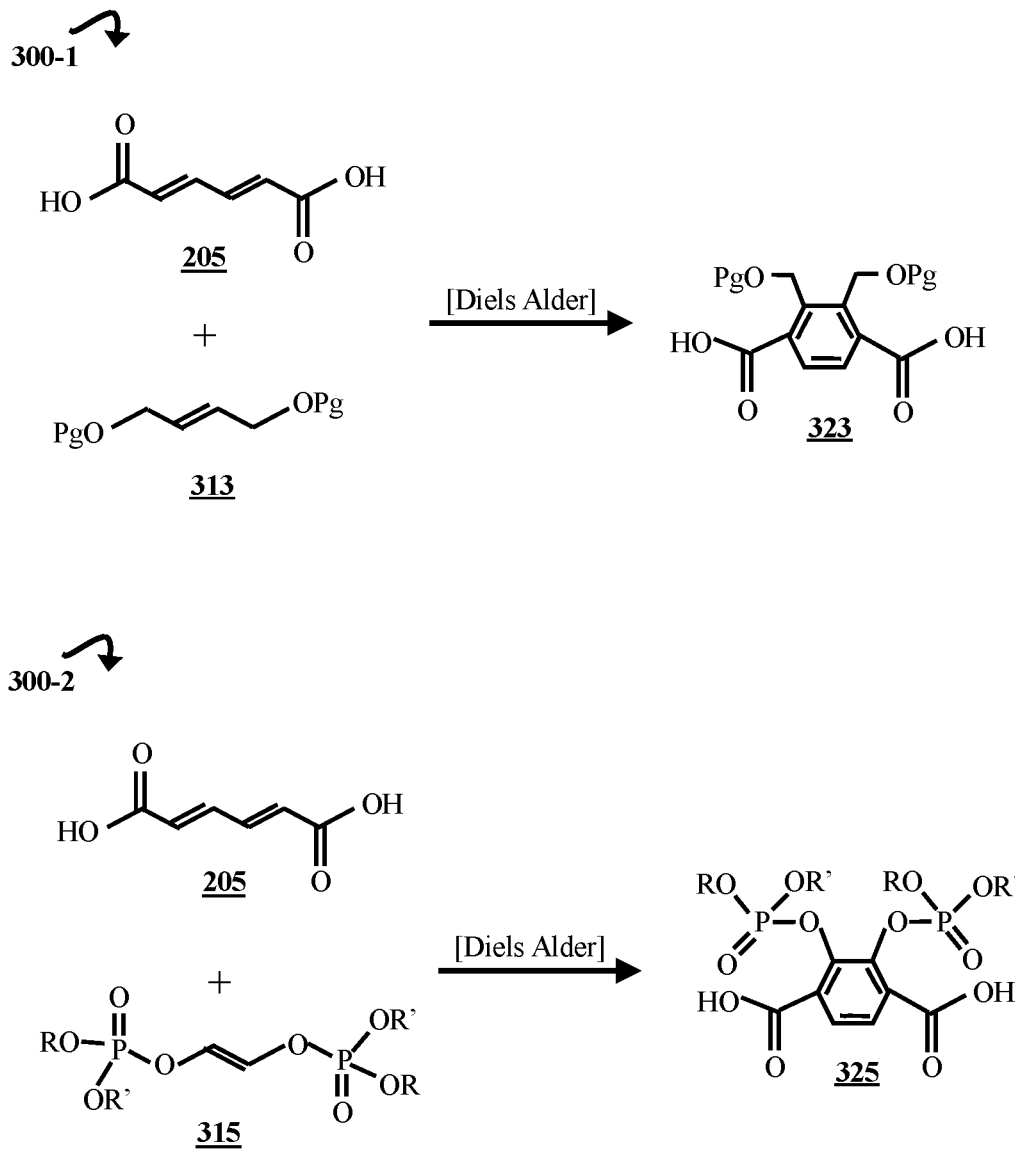
FIG. 3A is a chemical reaction diagram illustrating two processes of forming cyclic compounds from muconic acid and dienophiles, according to some embodiments of the present disclosure.

FIG. 3A is a chemical reaction diagram illustrating two processes 300-1 and 300-2 of forming cyclic compounds from muconic acid and dienophiles, according to some embodiments of the present disclosure. Each of the illustrated cyclic compounds includes a six-membered aromatic ring formed in a Diels-Alder reaction involving muconic acid 205 and a dienophile 313 or 315. In process 300-1, the dienophile is a 1,4-butenediol 313 having each of its hydroxyl protons replaced by a protecting group (Pg). Examples of protecting groups that can be used can include acetyl, trityl, benzyl, benzoyl, and ether (e.g., methoxymethyl ether, p-methoxybenzyl ether, tetrahydrofuran, tetrahydropyran, silyl ethers, etc.) groups. In some embodiments, protected diols with more than four carbons can be used instead of the protected 1,4-butenediol 313. For example, one or more methylene spacer (—$CH_2$—) groups (e.g. 1-10 spacer groups) can be added to the chain. Diols with fewer than four carbons in the chain (e.g., two carbons in an ethylene bridge) can also replace the protected 1,4-butenediol dienophile 313. In process 300-2, the dienophile is a phosphoric acid derivative 315 having two phosphorus-based moieties (—OPO(OR)(OR')) linked by an ethylene bridge. However, as with the protected 1,4-butenediol 313, the chain length of this bridge can be adjusted. Examples of R and R' groups that can be independently selected are discussed in greater detail with respect to FIG. 1. The end products of these Diels-Alder reactions are compounds 323 (process 300-1) and 325 (process 300-2).

Processes 300-1 and 300-2 can be carried out using substantially similar Diels-Alder reaction conditions. In each process 300-1 and 300-2, muconic acid 205 is reacted with the dienophile 313 or 315 to form cyclic muconic acid-derived compounds 323 and 325, respectively. These reactions are generally carried out at elevated temperatures (e.g., approximately 30° C.-300° C.) for several hours (e.g., approximately 2-24 hrs.) in the presence of a catalyst. In some embodiments, the reactions are catalyzed by a silicon-supported tungstate catalyst at approximately 200° C. for about 4-6 hours. However, the reactions can also be carried out at approximately 190° C. using a Sn-Beta zeolite catalyst. Another catalyst that can be used, at about 240° C., is palladium/carbon (Pd/C). Other Diels-Alder reactions to form the cyclic compounds 323 and 325 can include reactions involving titanium tetrachloride ($TiCl_4$) or oxidation using cobalt/manganese acetate ($Co(OAc)_2/Mn(OAc)_2$).

Figure 3B:
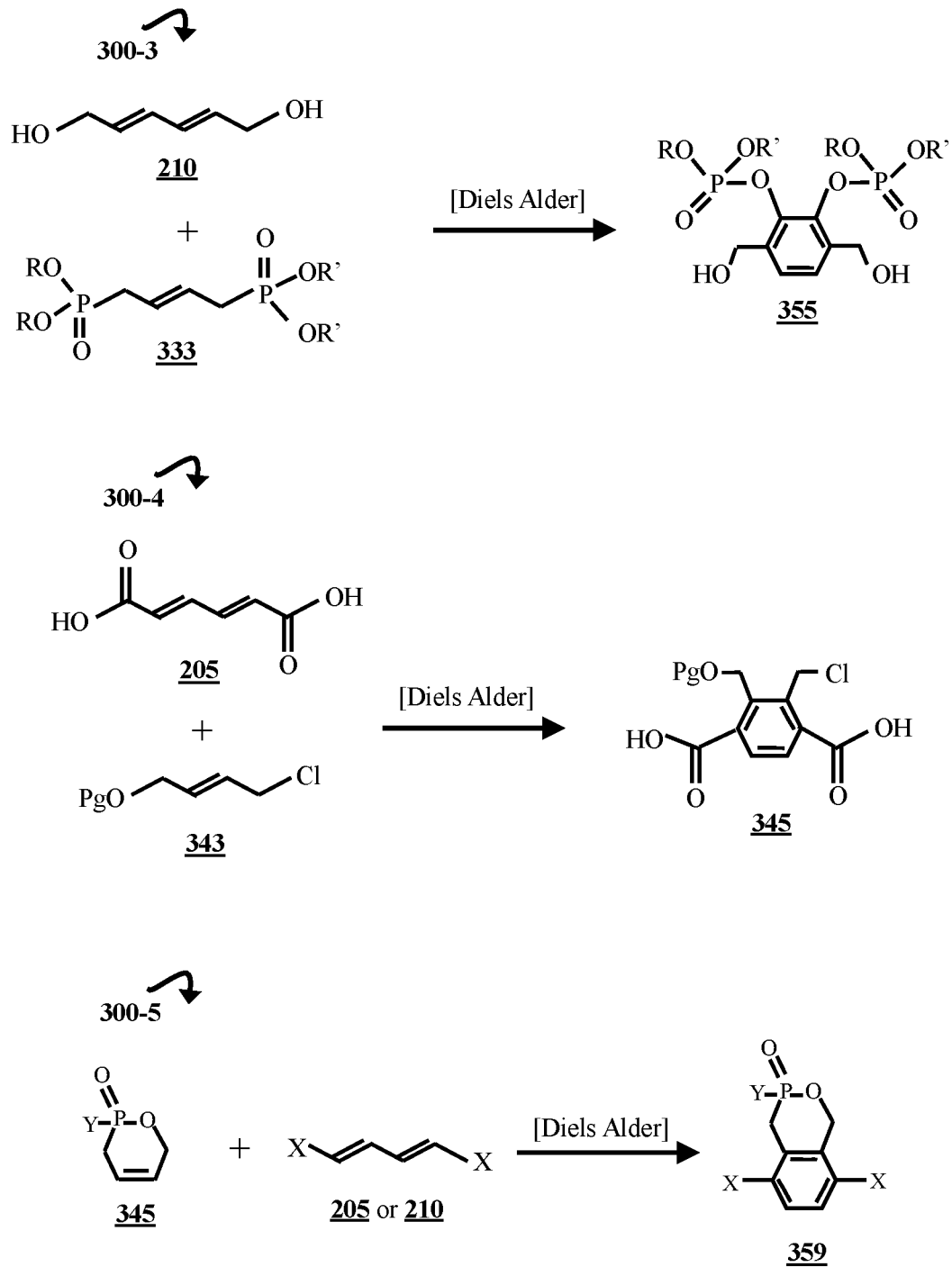
FIG. 3B is a chemical reaction diagram illustrating three processes of forming cyclic muconic acid-derived compounds that include six membered dienophile rings through Diels-Alder reactions, according to some embodiments of the present disclosure.

FIG. 3B is a chemical reaction diagram illustrating three processes 300-3, 300-4, and 300-5 of forming cyclic muconic acid-derived compounds that include six-membered dienophile rings through Diels-Alder reactions, according to some embodiments of the present disclosure. The muconic acid derivative used in process 300-3 is the hexadiene diol 210, and muconic acid 205 is used in process 300-4. Process 300-5 can use either muconic acid 205 or the diol 210. In process 300-5, these muconic acid compounds 205 and 210 are generically represented as having their carboxylate and hydroxyl groups replaced by X. In process 300-3, the dienophile is a phosphoric acid derivative 333 having two phosphorus-based moieties (—OPO(OR)(OR')) linked by a butadiene bridge. In process 300-4, the dienophile is a 4-chloro-2-buten-1-ol derivative 343 having its hydroxyl proton replaced by a protecting group (Pg). Examples of protecting groups that can be used are discussed in greater detail with respect to FIG. 3A. As with dienophiles 313 and 315 of processes 300-1 and 300-2, respectively, chain lengths in dienophiles 333 and 343 can be adjusted.

Process 300-5 uses a six-membered cyclic phosphorus compound (6CP) 345 as a dienophile. The 6CP 345 has a Y functional group bonded to it at the phosphorus atom. The Y functional group is chosen from a group consisting of R, OR, and Cl groups. Examples of R groups are discussed in greater detail with respect to FIG. 1. The 6CP dienophile 345 can also be replaced with a five-membered cyclic phosphorus compound (5CP, not shown). The 5CP also includes a Y group bound to phosphorus and has substantially similar reactivity to the 6CP dienophile 345.

Processes 300-3, 300-4, and 300-5 each involve Diels-Alder reactions to form cyclic muconic acid-derived compounds. Examples of Diels-Alder reaction conditions that can be used are discussed in greater detail with respect to FIG. 3A. The terephthalic acid derivative formed in process 300-3 is a flame-retardant terephthalic acid derivative 355 having two phosphorus-based moieties provided by the dienophile 333. The terephthalic acid derivative formed in process 300-4 is a terephthalic acid derivative 355 having a protected hydroxymethyl (—$CH_2$OPg) group and a chloroalkyl (—$CH_2$Cl) group. Process 300-5 forms a flame-retardant bicyclic compound 359 having either carboxylic acid groups or hydroxyl groups (represented generically by X), depending upon whether muconic acid 205 (carboxylic acid groups) or the hexadiene 210 (hydroxyl groups) were used in the reaction.

Figure 4:
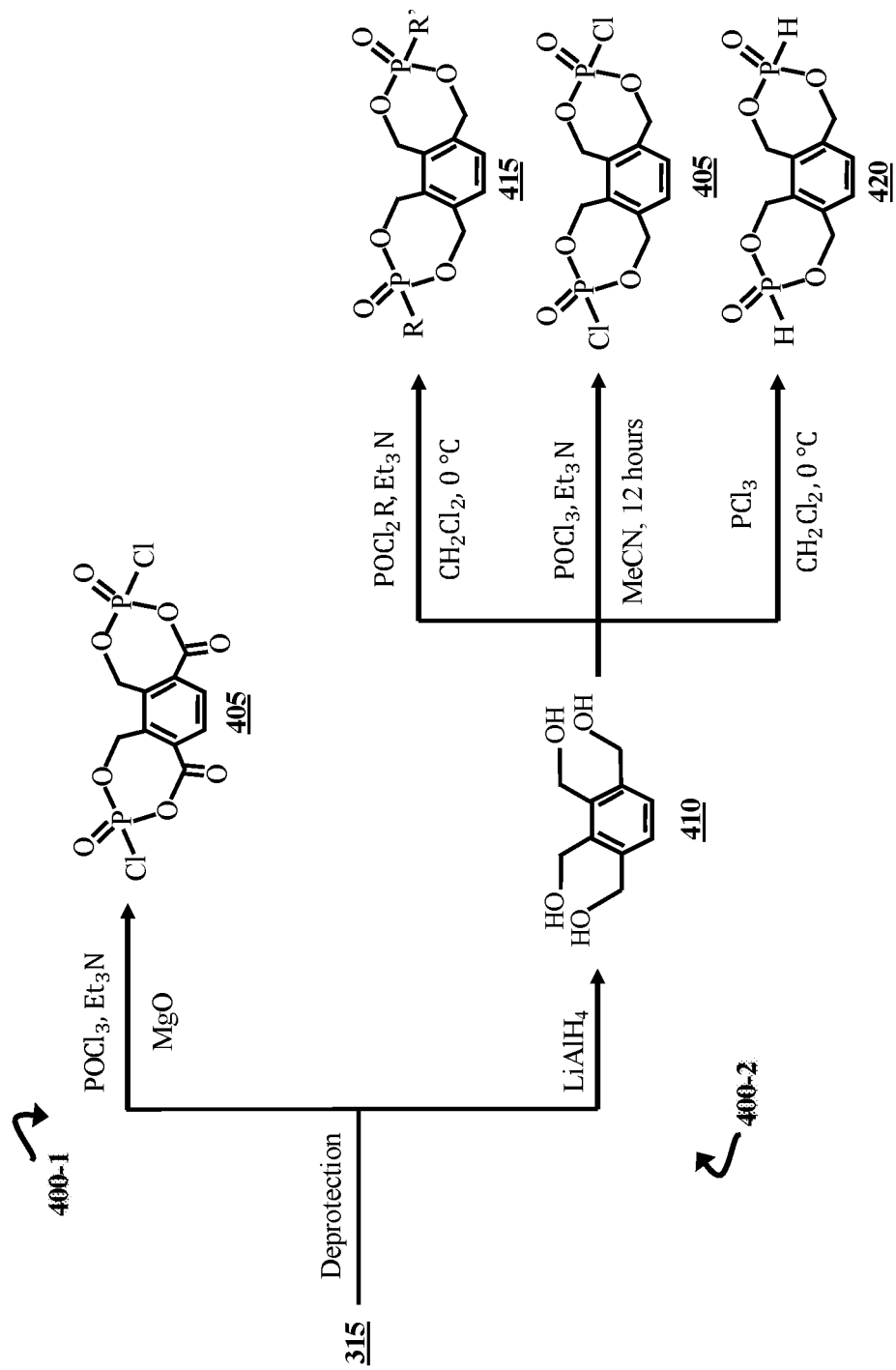
FIG. 4 is a chemical reaction diagram illustrating a process of forming tricyclic flame-retardant compounds, according to some embodiments of the present disclosure.

FIG. 4 is a chemical reaction diagram illustrating processes 400-1 and 400-2 of forming tricyclic flame-retardant compounds, according to some embodiments of the present disclosure. Both processes 400-1 and 400-2 begin with the deprotection of compound 315 (from process 300-1 in FIG. 3A). Any appropriate deprotection conditions can be used. Deprotection is discussed in greater detail with respect to FIG. 3A. Both processes 400-1 and 400-2 can result in the formation of a chloro-substituted flame-retardant compound 405, but compounds with other substituents can be formed as well, depending on the phosphorus compounds employed. Examples involving other substituents are discussed with respect to process 400-2.

Two methods are outlined to form compound 405. The first of these methods, in process 400-1, includes the preparation of a solution of deprotected intermediate compound 315 in triethyl amine ($Et_3N$) under argon. Phosphoryl chloride ($POCl_3$) is added at room temperature. This mixture is stirred at room temperature for about 15-20 hours and then concentrated under vacuum to form a residue. The residue is eluted through a short silica gel column using dichloromethane/hexane. The second method, in process 400-2, includes reduction of deprotected intermediate 315 by lithium aluminum hydride ($LiAlH_4$). This results in a tetrahydroxy intermediate 410. A stirred solution of $POCl_3$ in toluene at approximately 0° C. is subsequently added to a mixture of tetrahydroxy intermediate 410 and $Et_3N$ in acetonitrile (MeCN). This mixture is stirred for approximately twelve hours and then filtered. The resulting filtrate is concentrated at reduced pressure, yielding tricyclic flame-retardant compound 405.

In process 400-2, tetrahydroxy intermediate 410 can also be used to make additional tricyclic flame-retardant compounds 415 and 420. In the synthesis of compound 415, tetrahydroxy intermediate 410 is combined with an R-substituted phosphine oxide derivative ($POCl_2R$) and $Et_3N$. Tetrahydroxy intermediate 410 is dissolved in dichloromethane ($CH_2Cl_2$) at approximately 0° C. in a partially evacuated two-necked flask fitted with a reflux condenser and an addition funnel that contains a $CH_2Cl_2$ solution of $POCl_2R$. While stirring the mixture at 0° C., the $POCl_2R$ is slowly added (e.g., at a rate of about 0.5 mL/minute). The mixture is then allowed to warm up to room temperature, and flame-retardant compound 415 is distilled from the mixture. The reaction conditions to form compounds 415 and 420 are substantially the same aside from the selection of phosphorus compound. When phosphorus trichloride ($PCl_3$) is used in place of $POCl_2R$, tricyclic flame-retardant compound 420 is produced.

Figure 5:
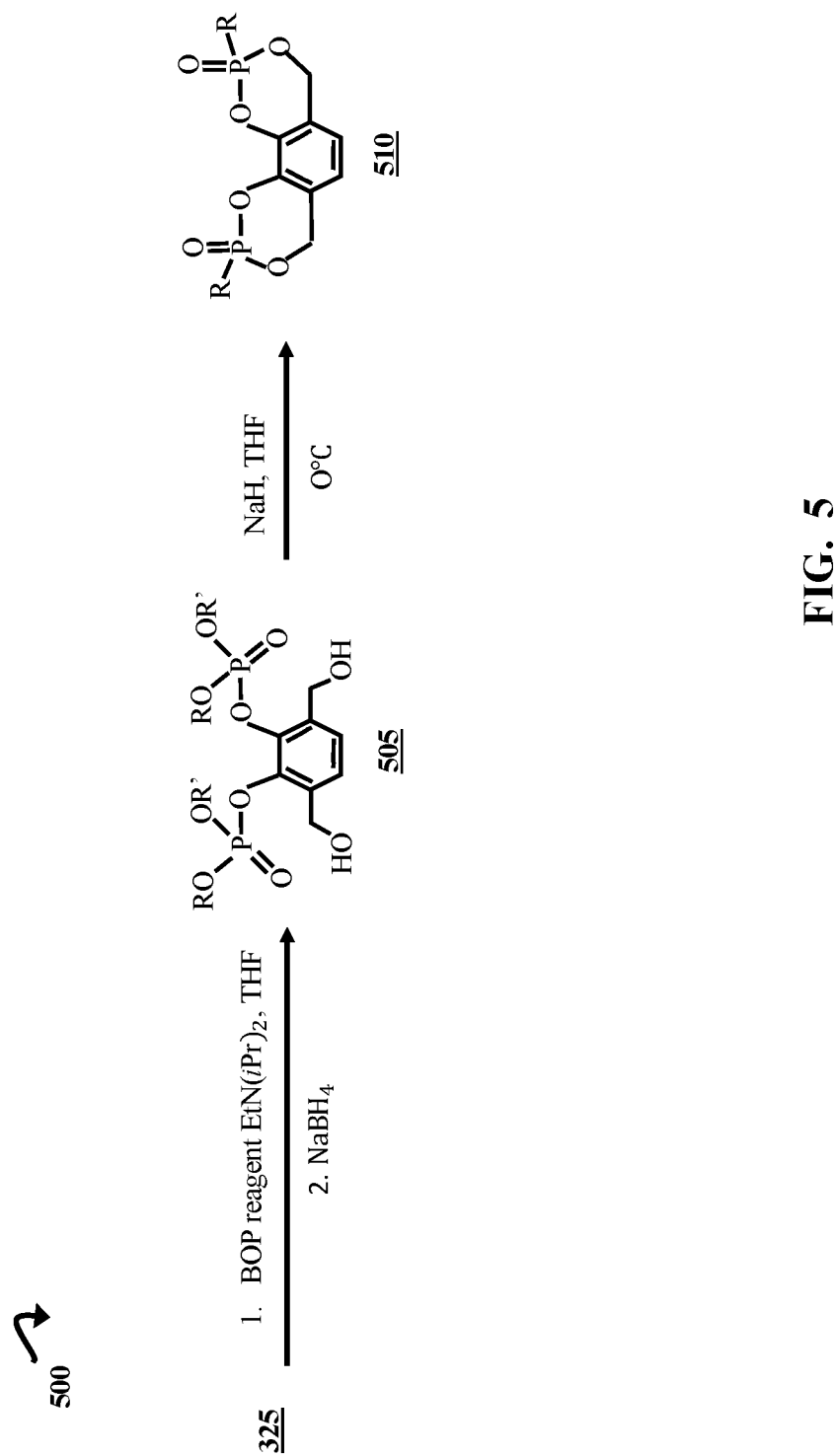
FIG. 5 is a chemical reaction diagram illustrating a process of forming an additional tricyclic flame-retardant compound, according to some embodiments of the present disclosure.

FIG. 5 is a chemical reaction diagram illustrating a process 500 of forming an additional tricyclic flame-retardant compound, according to some embodiments of the present disclosure. Muconic acid-derived flame-retardant compound 325 (from process 300-2 in FIG. 3A) is combined with (benzotriazol-1-yloxy)tris(dimethylamino)phosphonium hexafluorophosphate (BOP reagent) in tetrahydrofuran (THF). While stirring this mixture at room temperature, N,N-diisopropylethylamine (EtN(iPr)$_2$) is added. The resulting mixture is stirred for approximately five minutes, and then sodium borohydride (NaBH$_4$) is added. The resulting solution is stirred for approximately twenty minutes, which substantially evaporates the solvent. The residue left is mixed with ethyl acetate, washed with 5% hydrochloric acid, saturated sodium bicarbonate, and brine, and then dried with sodium sulfate. The substance is filtered and purified, yielding a flame-retardant dihydroxy compound 505. This compound 505 is combined with sodium hydride (NaH) in THF and stirred at room temperature for approximately thirty minutes, yielding tricyclic flame-retardant compound 510.

Figure 6:
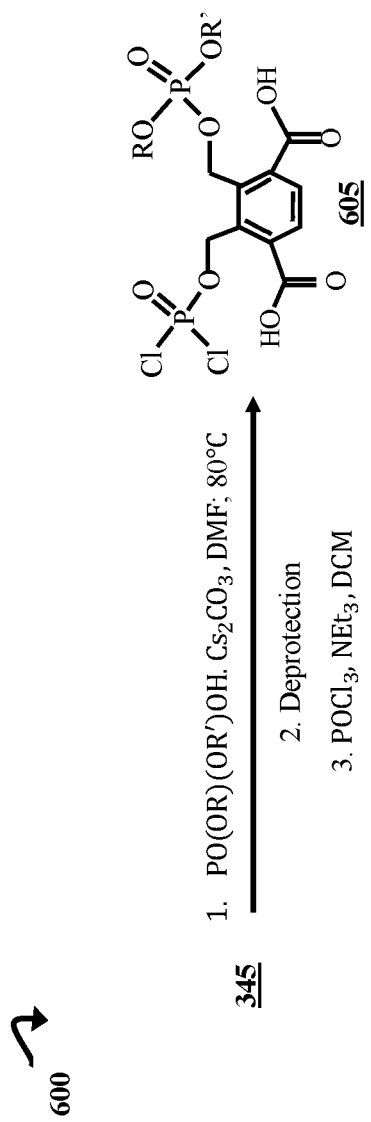
FIG. 6 is a chemical reaction diagram illustrating a process of forming a flame-retardant compound from a terephthalic acid derivative having a protected hydroxymethyl group and a chloroalkyl group, according to some embodiments of the present disclosure.

FIG. 6 is a chemical reaction diagram illustrating a process 600 of forming a flame-retardant compound from a terephthalic acid derivative, according to some embodiments of the present disclosure. In this example, the terephthalic acid derivative 355 formed in process 300-5 is reacted with a phosphorus compound to form muconic acid-derived flame-retardant compound 605. Process 600 includes three steps. The first step involves the formation of a protected intermediate compound having a single phosphorus-based moiety. The second step involves a reaction to remove the protecting group from the intermediate. In the third step, a second phosphorus-based moiety is added in the place of the protecting group to form muconic acid-derived flame-retardant compound 605. The phosphorus compound illustrated in the first step is a phosphonic acid derivative (PO(OR)(OR')OH), and the phosphorus compound illustrated in the third step is POCl$_3$. However, any appropriate phosphorus compound can be used in each step. Examples of phosphorus compounds that can be used, and of R groups that can be substituents on the phosphorus compounds, are discussed in greater detail above.

In the first step of process 600, a suspension of PO(OR)(OR')OH and cesium carbonate (Cs$_2$CO$_3$) in anhydrous dimethylformamide (DMF) is stirred at room temperature under a nitrogen atmosphere. The mixture is then added dropwise to a solution of the terephthalic acid derivative 355 in DMF. The resulting solution is stirred at room temperature for approximately 1 hour, and then at about 80° C. for approximately 5-8 hours. The resulting reaction mixture, which includes a precipitate, is then filtered through a sintered funnel, and the precipitate is washed with ethyl acetate. The combined filtrates are concentrated under reduced pressure. The remaining concentrated residue is diluted with ethyl acetate and washed with brine, dried over sodium sulfate, and concentrated in vacuo. The residue is then purified by silica gel chromatography using an ethyl acetate gradient (e.g., 0-100% or 0-50%) in hexane. The resulting substance is the deprotected intermediate (not shown).

The second step in process 600 includes a deprotection reaction with this intermediate compound. Any appropriate deprotection conditions can be used. Deprotection is discussed in greater detail above. In the third step of process 600, POCl$_3$ and triethyl amine (NEt$_3$) are then added to the resulting deprotected intermediate in CH$_2$Cl$_2$, forming muconic acid-derived flame-retardant compound 605. This compound 605 includes chloro (—Cl) substituents, which can be reacted further with phosphorus compounds or other nucleophiles. For example, a reaction with a phosphorus compound can replace one or both of the chloro substituents with additional phosphorus-based moieties.

Figure 7:
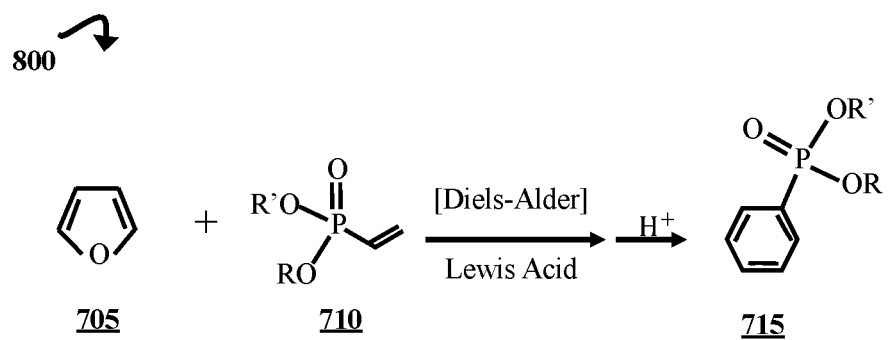
FIG. 7 is a chemical reaction diagram illustrating a process of forming a flame-retardant furan-derived compound, according to some embodiments of the present disclosure.

FIG. 7 is a chemical reaction diagram illustrating a process 700 of forming a furan-derived flame-retardant compound, according to some embodiments of the present disclosure. In process 700, furan 705 is reacted with a phosphorus compound having an allyl R group 710. However, the allyl group can be replaced by other R groups having varying chain lengths (e.g., 2-20 carbon atoms) with terminal vinyl groups. Further, the phosphorus compound can be replaced by any of the phosphorus compounds discussed above, resulting in analogous flame-retardant compounds. When cyclic phosphorus compounds (e.g., 5CP or 6CP) are used, bicyclic flame-retardants can be formed.

The furan 705 illustrated in process 700 is unsubstituted. However, substituted furans (e.g., 2,5-dimethylfuran, 2,5-diethylfuran, 2,5-furandicarboxylic methyl ester, 2,5-furandicarboxylic acid) can be used in other embodiments. When substituted furans are used, additional reactions can be carried out with the substituents. For example, when 2,5-dimethylfuran is used in place of the unsubstituted furan 705, the methyl groups on the resulting flame-retardant compound (e.g., analogous to compound 715) can be oxidized in a reaction with potassium permanganate (KMnO$_4$) to form carboxylic acid substituents.

The muconic acid- and furan-derived flame-retardant compounds described herein can be polymerized in different ways, depending on their R functional groups. If their R functional groups are reactive (e.g., allyl groups, vinyl groups, allyloxy groups, etc.), the flame-retardant compounds can be polymerized or bound to polymer chains. However, if the R functional groups are non-reactive (e.g., alkyl groups, aryl groups, aryloxy groups, etc.), the bio-renewable flame-retardant compounds are small molecules and be blended into a variety of polymers. Formation of the flame-retardant polymers is discussed in greater detail with respect to FIG. 1.

It should be noted that, in some embodiments, the compounds described herein can contain one or more chiral centers. These can include racemic mixtures, diastereomers, enantiomers, and mixtures containing one or more stereoisomer. Further, the disclosed compounds can encompass racemic forms of the compounds in addition to individual stereoisomers, as well as mixtures containing any of these. Ranges (e.g., time, concentration, temperature, etc.) indicated herein include both endpoints and all numbers between the endpoints. The use of "about" or "approximately" in connection to a range applies to both ends of the range. Unless otherwise specified, conventional solvent can be used in the reactions described herein (e.g., dichloromethane, acetonitrile, ethers, etc.). The solvent is chosen based on solubility of reactants, temperature of the reaction, reactivity of the solvent, etc.

The synthetic processes discussed herein, and their accompanying drawings are not to be construed as limiting. One skilled in the art would recognize that a variety of synthetic reactions may be used that vary in reaction conditions, components, methods, etc., which ultimately generate cyclic bio-renewable flame-retardant compounds. In addition, the reaction conditions can optionally be changed over the course of a process. Further, in some embodiments, processes can be added or omitted while still remaining within the scope of the disclosure, as will be understood by a person of ordinary skill in the art.

What is claimed is:

1. A bio-renewable flame-retardant compound, of formula:

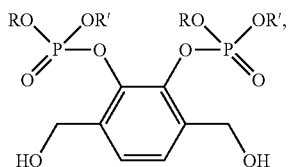
wherein R and R' are alkyl moieties; and
wherein the phenyl cyclic moiety is formed in a Diels-Alder reaction involving a bio-renewable diene and a dienophile.
2. The compound of claim 1, wherein at least one of the phosphate ester moieties is able to bind to a polymer.
3. The compound of claim 1, wherein the bio-renewable diene is muconic acid.
* * * * *